Feb. 25, 1947.  A. E. HOLUB  2,416,585
REEL FOR BARBED WIRE
Filed May 9, 1945　　2 Sheets-Sheet 1

Inventor
ARTHUR E. HOLUB

By Clarence A. O'Brien
and Harvey B. Jacobson
Attorneys

Feb. 25, 1947. A. E. HOLUB 2,416,585
REEL FOR BARBED WIRE
Filed May 9, 1945 2 Sheets-Sheet 2
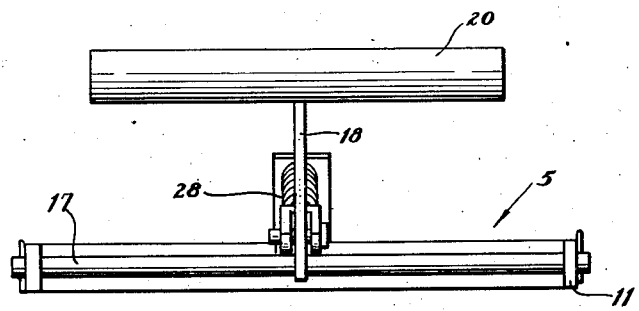
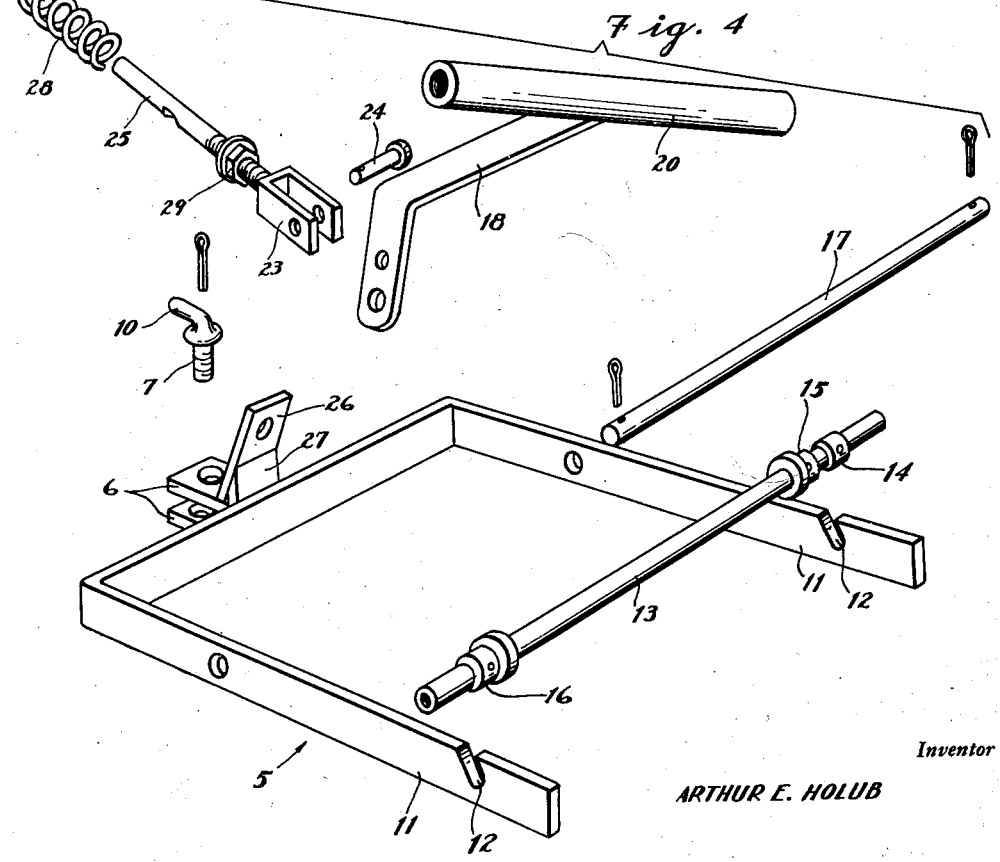
Inventor
ARTHUR E. HOLUB Patented Feb. 25, 1947

2,416,585

UNITED STATES PATENT OFFICE 2,416,585

REEL FOR BARBED WIRE

Arthur E. Holub, Wyoming, Iowa

Application May 9, 1945, Serial No. 592,867

1 Claim. (Cl. 242—99)

The present invention relates to new and useful improvements in reels for unwinding wire of a type used for fencing.

An important object of the present invention is to provide a reel holder from which the wire may be unwound and embodying means for attaching the reel holder in operative position to a conventional form of tractor drawbar whereby the wire may be unwound from the reel as the tractor drives over the ground.

A further important object of the invention is to provide means for easily and quickly mounting a reel of wire in position on a supporting frame attached to the tractor and also providing brake means for the reel to prevent the unwinding of the wire at too great a speed and thus avoid tangling of the wire.

A still further object is to provide an apparatus of this character of simple and practical construction, which is strong and durable, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an end elevational view with the reel shaft removed, and

Figure 4 is a group perspective view.

Figure 1:
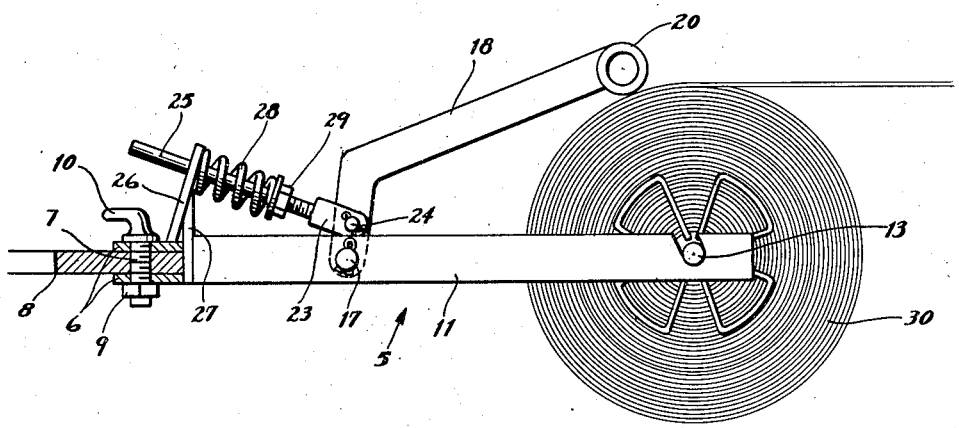
Figure 1 is a side elevational view.
Figure 2:
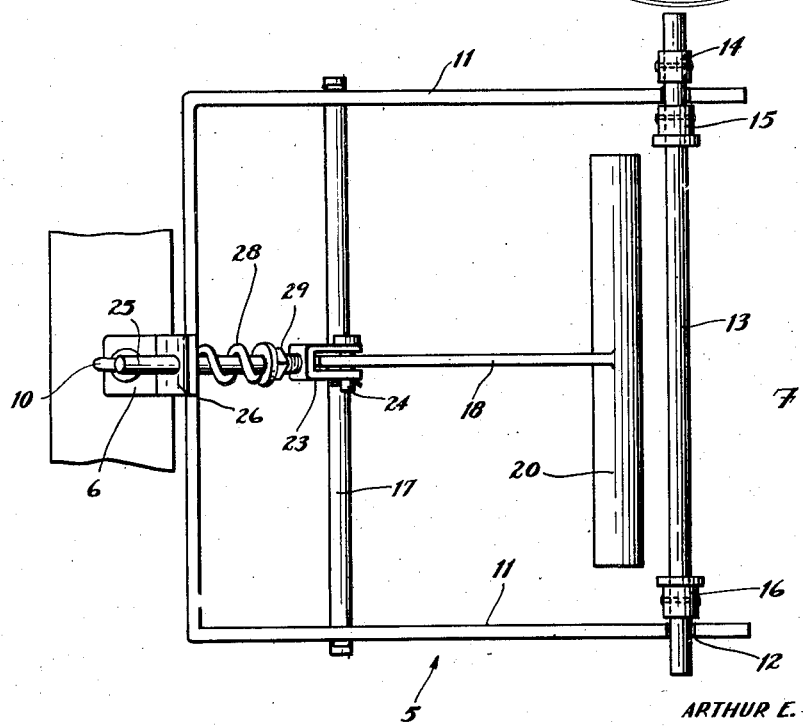
Figure 2 is a top plan view.

Referring now to the drawings in detail wherein for the purpose of illustration I have disclosed a preferred embodiment of the invention the numeral 5 designates a U-shaped frame having a pair of spaced apart clamping plates 6 welded or otherwise suitably secured thereto and projecting outwardly from the bight portion of the frame and through which a screw 7 is freely inserted for rotation therein; the screw passing through a drawbar 8 and secured thereto by nut 9.

The upper end of the screw is bent angularly to form a handle 10 to clamp the plates 6 to the drawbar of a conventional form of tractor and with the frame 5 extending rearwardly therefrom.

The upper edges of the legs 11 of the frame 5 adjacent their rear ends are formed with forwardly inclined notches 12 in which a shaft 13 is positioned and on which a reel of wire, such as barbed wire used for fencing, is supported for free rotation on the shaft. The ends of the shaft project outwardly from the opposite sides of the legs 11 of the frame and secured on one end of the shaft outwardly of one of the legs 11 is a collar 14 and also secured on the shaft at the opposite side of the leg from the collar 14 is a flanged collar 15, the collars 14 and 15 retaining the shaft against lateral sliding movement in the notches 12.

Also positioned on the shaft adjacent its opposite end and against the inner side of the other of said leg members is a flanged collar 16, the wire reel being positioned between the flanged collars 15 and 16 to prevent end thrust of the reel on the shaft.

The outwardly projecting ends of the shaft 13 provide handles to facilitate the lifting of the reel of wire into and out of position on the outer ends of the legs 11 of the frame.

A rod 17 extends transversely of the frame 5 adjacent its inner end and on which one end of an arm 18 is pivotally mounted, the arm extending upwardly from the rod 17 and rearwardly between the sides of the frame 5. A rod or shaft 20 is secured transversely at the rear end of the arm 18 and adapted to bear against a reel of wire 30 journaled on the shaft 13 to function as a brake.

A yoke 23 is pivoted on the front end of the arm 18 by means of a pin 24 and from the yoke a rod 25 extends rearwardly through a plate 26 for free sliding movement therein. A brace 27 rising from the rear end of the frame 5 supports the plate.

A coil spring 28 is mounted on the rod 25 with one end bearing against the plate 26 and its other end bearing against an adjusting nut 29 threaded on the front end of the rod 25.

In placing the reel of wire on the shaft 13 the shaft is lifted from the notches 12 of the frame 5 and the flanged sleeve 16 removed whereby the shaft may be inserted through the reel and the sleeve 16 replaced and the shaft then mounted in the notches 12 of the frame so that the sleeves 15 and 16 will bear against the opposite sides or ends of the reel.

The tension of the spring 28 for the brake rod 20 may be adjusted by the nut 29.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claim.

Having described the invention, what I claim is:

A reel holder comprising a U-shaped frame, a clamping device at the bight portion of the frame adapted for attaching to a tractor drawbar, the leg portions of the frame having notches in the upper edges thereof, a shaft freely supported in said notches and adapted for rotatably supporting a reel, means on the shaft engaging one of the leg portions to retain the shaft against transverse movement in the frame, a transverse bar carried by the frame, an arm pivoted at one end on the bar and adapted to be swung toward the reel, a transverse brake rod at the free end of the arm adapted to bear against the reel when said arm is swung toward the same, a rod extending forwardly from the arm and movable endwise to swing the same, a guide supported on said frame and slidably receiving the front end of the last named rod to guide the same during endwise movement thereof, and spring means carried by said last named rod for moving the same endwise and thereby urging the brake rod toward the reel.

ARTHUR E. HOLUB.

REFERENCES CITED

The following references are of record in the file of this patent:

UNITED STATES PATENTS

| Number | Name | Date |
|---|---|---|
| 126,483 | Perkins | May 7, 1872 |
| 889,038 | Parker | May 26, 1908 |
| 1,041,142 | Moore | Oct. 15, 1912 |
| 1,839,099 | Helmke | Dec. 29, 1931 |
| 592,453 | Sisum | Oct. 26, 1897 |
| 885,210 | Wrench | Apr. 21, 1908 |